United States Patent [19]

Prewo

[11] 4,260,441
[45] Apr. 7, 1981

[54] QUICK BOND COMPOSITE AND PROCESS

[75] Inventor: Karl M. Prewo, Vernon, Conn.

[73] Assignee: United Technologies Corporation, Hartford, Conn.

[21] Appl. No.: 904,709

[22] Filed: May 10, 1978

Related U.S. Application Data

[63] Continuation-in-part of Ser. No. 751,576, Dec. 12, 1976, abandoned.

[51] Int. Cl.² ............................................. B23K 31/02
[52] U.S. Cl. ..................................... 156/166; 156/176; 228/190; 428/114; 428/161; 428/162; 428/164; 428/166; 428/226; 428/294; 428/593; 428/902
[58] Field of Search ............... 428/113, 294, 593, 606, 428/607, 608, 614, 941, 161, 162, 164, 166, 226, 902, 114; 228/190; 156/166, 176

[56] References Cited

U.S. PATENT DOCUMENTS

| | | | |
|---|---|---|---|
| 3,819,461 | 6/1974 | Saffadi | 428/902 |
| 3,953,641 | 4/1976 | Marquis | 428/902 |
| 3,984,043 | 10/1976 | Kreider | 228/190 |
| 3,997,697 | 12/1976 | Brochier | 428/902 |

Primary Examiner—Marion E. McCamish
Attorney, Agent, or Firm—Charles A. Warren

[57] ABSTRACT

A monolayer tape for use in making up a multilayer matrix or composite which is bonded at a high pressure and temperature by pressing the composite between heated platens in air to cause densification, the tape consisting of collimated fibers held together by metal wire woven with and at right angles to the fibers, the wire being the same material as the matrix to become a part thereof when the composite is bonded. The aluminum matrix in which the fibers are embedded is provided by aluminum foils alternating with the collimated fibers in the multilayer matrix.

2 Claims, 3 Drawing Figures

ND PROCESS

This is a continuation-in-part application of Ser. No. 751,576 filed Dec. 12, 1976, now abandoned.

BACKGROUND OF THE INVENTION

The quick bond process described in U.S. Pat. No. 3,984,043 was developed to make possible the manufacture in air of an aluminum matrix composite reinforced by a plurality of parallel layers of unidirectional filaments. This "air bonding" process comprises positioning a plurality of filament reinforced aluminum matrix monolayer tapes in a stack and then pressing the stack between heated platens or dies at high pressure in air to densify the matrix, the platen temperature causing bonding of the matrix to the filaments and bonding the matrices of adjacent tapes in the stack to each other. In this patent, the monolayer tapes were made by bonding the layer of filaments to an aluminum backing foil by a plasma sprayed metal coating, such as aluminum, on the surface of the filaments opposite to the foil. This coating entirely covered the filaments and protected them from oxidation during assembly in the stack. It was hoped that other less expensive forms of tapes could be developed that would produce equally acceptable matrix composites.

SUMMARY OF THE INVENTION

A feature of this invention is a monolayer filament tape consisting of collimated fibers, preferably boron, with in some cases a silicon coating, held in collimated form by aluminum wires woven with the fibers. There is no foil backing on either side of the tape. This tape is then interleaved with sheets of aluminum foil in making a stacked high strength matrix composite that is bonded together and densified by compacting it between heated platens at a high pressure and at a temperature below the liquidus temperature of the aluminum matrix. With this tape, the compacting and bonding may be done in air, as in the process of the above patent, thereby avoiding the necessity for a vacuum chamber for the compaction and bonding as well as avoiding the long time cycle required for vacuum pump-down and subsequent heating in a vacuum or inert atmosphere.

According to the present invention, the tape is produced by forming a single layer of collimated fibers and interweaving with them, crosswise aluminum wires which serve to hold the fibers in the single layer collimated condition during assembly with interleaved layers of aluminum foil in making the multilayer composite. The interwoven wires are spaced from one another and a minimum number of these crosswires are utilized, only enough to permit handling of the collimated layer without affecting its integrity. It has been found that the wires, during bonding and densification, become an integral part of the aluminum matrix and essentially disappear in the matrix. Although the assembly of the tapes and foil in the stack is done in air, and the bonding and densification are also done in air, the strength of the finished product is higher than would be expected.

The foregoing and other objects, features, and advantages of the present invention will become more apparent in the light of the following detailed description of preferred embodiments thereof as shown in the accompanying drawing.

DESCRIPTION OF THE PREFERRED EMBODIMENT

A particular method for assembly and bonding of a plurality of stacked tapes is described in the above-identified U.S. Pat. No. 3,984,043, where the assembly, densification, and bonding are all carried out in air thereby being a low-cost, quick bond with fewer limitations on the finished size of the composite. By this process the finished size is limited only by the size of the press available and not by the size of available vacuum chambers which were necessary previously as the densification and bonding were done in a vacuum. In this patent, the filaments or fibers of the individual tapes were all covered by a plasma sprayed aluminum coating that held the fibers to the aluminum backing foil forming a part of the tape. The plasma coating effectively prevented oxidation of the fibers during stacking of the tapes to form the composite and also during bonding and densification of the composite. It is well known that oxidation of the fibers, which occurs with exposure to air and is particularly rapid at the high bonding temperatures used, results in significant loss of strength of the fibers resulting in a much weaker composite. Accordingly, it has been believed necessary in handling tapes of this character that the fibers must be completely covered to prevent this detrimental oxidation particularly during the bonding and compaction. Until the advent of this patent, in fact, it was considered necessary to do the compaction and bonding in a vacuum so that a minimum of oxidation would occur.

The tape used in this invention is a simple form of tape that is particularly usable in this process and which itself is simple to produce and inexpensive. This tape is not itself novel; the invention is the use of this tape in an air compaction process. This tape can be used in the air bonding process to produce an acceptable composite structure of high strength. It has been found that a tape of this character can be used in making the stack and that the effect of the aluminum foils interleaved with the tapes in reducing the oxides on the filaments during compaction and bonding will restore the strength to the fibers with the result that the composite has substantially the same strength as composites previously compacted and bonded in a vacuum.

Figure 1:
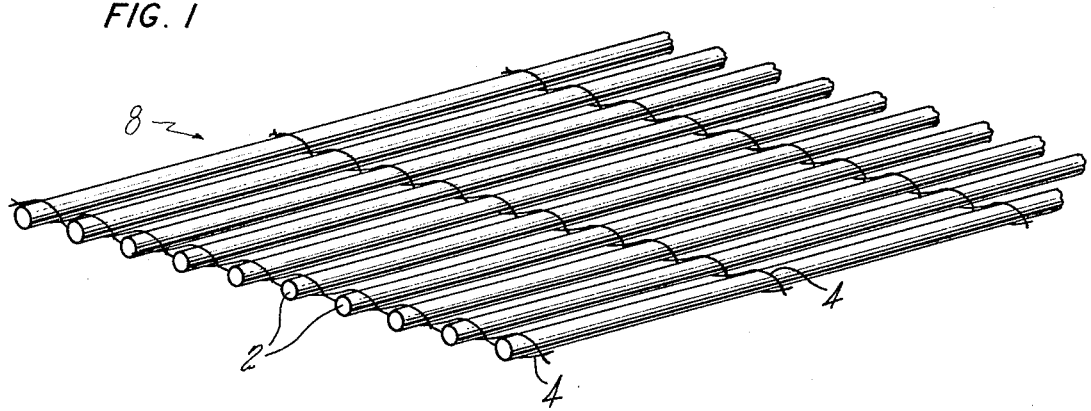
FIG. 1 is an enlarged perspective view of the tape.

To produce this tape, a plurality of filaments or fibers 2, for example boron fibers, silicon carbide fibers, or silicon coated boron fibers, are collimated in a single layer, as shown in FIG. 1. These filaments in the layer are not in contact with one another and are held in the desired spaced relation and in the single layer configuration by crosswires 4 woven with the fibers, preferably at 90° to the fibers, and in spaced relation to one another. Only enough of these crosswires are used as are needed to hold the fibers in collimated relation as the tapes are handled in making the composite. These crosswires are aluminum to bond with and to blend in and become a part of the aluminum of the interleaved foils in forming the composite. This tape differs from the usual tape in that it has no matrix or foil backing as such. The tape is solely the fibers and the interwoven support wires. The usual aluminum foil backing sheet is not needed.

Figure 2:
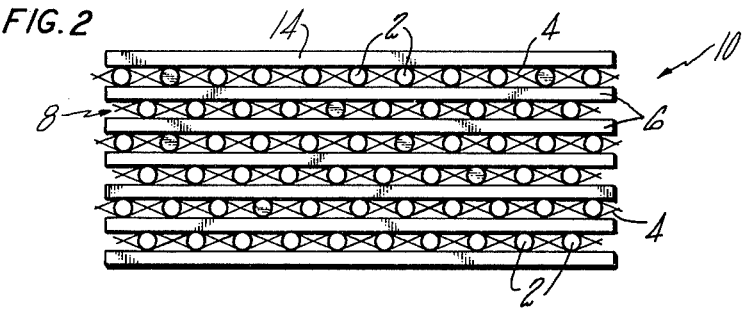
FIG. 2 is an enlarged end view of a stack of tapes.

In use the aluminum for the matrix of the composite is provided by interleaving sheets 6 of aluminum foil between adjacent tape layers 8, FIG. 2. This arrangement permits a rapid assembly of the several tapes or sheets for the multilayer composite and permits an excellent control of the percentage of matrix in the completed composite structure, since thicker or thinner aluminum foil sheets may be interleaved with the tapes or the number of interleaved foil sheets may be varied to produce the proper percentage of aluminum matrix.

The completed tapes, that is the fibers with the interwoven aluminum crosswires are cut to appropriate sized pieces for stacking with the interleaved foil sheets to build up the composite structure or stack 10, FIG. 2. The thickness of the foil sheets is selected so as to provide the desired percentage of matrix in the finished composite and, for best strength characteristics in the finished composite only one sheet or foil is desirably between each piece of tape in the stack. This single thickness is not always necessary; it is, however, desirable in producing the highest strength characteristics in the matrix.

Figure 3:
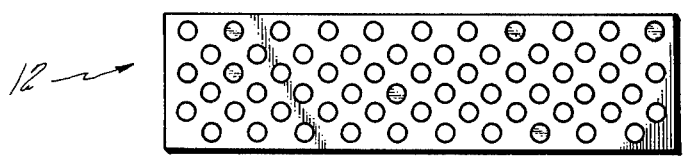
FIG. 3 is an enlarged end view of a completed composite.

The assembled stack is then heated and densified by compression between heated platens or dies in a press, as described in the above-identified patent, to form the completed composite 12, FIG. 3. The deformation of the aluminum foil sheets during compaction, and the heating of the composite to a temperature just below the liquidus temperature of the foils assures bonding of the aluminum foils to one another and to the fibers of the several tapes. The aluminum crosswires becomes an integral part of the matrix during the compaction and bonding under pressure.

It is well known that aluminum oxidizes rapidly and that the surfaces of aluminum foil are in fact aluminum oxide coatings; and, to achieve a good bond between the foils and the fibers of the composite, this coating must be broken to expose the unoxidized aluminum of the foil for contact with the fibers. This occurs during the bonding and compaction process as the foils are deformed around the fibers and the pure aluminum is exposed and brought into contact with the fibers and also with the adjacent foils. Since the aluminum of the foils is thus in direct contact with the other foils and the fibers also, a better bond is obtained than would otherwise occur and the strength of the composite is thus increased.

Unlike the boron fibers exposed to air at elevated temperature, the procedure of combining the fibers with aluminum prevents permanent loss of fiber strength. The local preferential oxidation of the aluminum in the vicinity of the fibers inhibits the oxidative damage to the fibers, enabling the formation of a high strength final composite material.

It was expected that the fibers would oxidize during the assembly and subsequent bonding and densification at elevated temperatures because there was no coating on the fibers to prevent oxidation as in the plasma sprayed tapes. The degradation of boron fibers due to exposure to air at elevated temperature is illustrated by the following experiment. Boron fibers were exposed to air at 550° C. for 10 minutes. The average tensile strength of these fibers prior to exposure was 520,000 psi while the strength after exposure was measured to be 350,000 psi. Thus, the strength was reduced by 33% due to oxidation of the fibers. The desired high strength of these composites was achieved, however, even without the protection against oxidation by reason of the reduction of these oxides during compaction as above stated. It was found desirable to minimize the assembly time for the composite and also to minimize the time prior to the application of pressure on the composite after positioning the composite between the heated platens. This was accomplished by reason of the simplified form of the tapes and the single layer of foil to be placed between adjacent tapes. Once the stack of tapes and foil was completed the stack could immediately be placed in the press and bonding and compaction started immediately without any time interval necessary for producing a vacuum as in prior compaction in vacuum chambers.

The crosswires of the tapes being aluminum are incorporated in and become a part of the aluminum matrix so that they disappear in the finished composite. The compaction of the foils around the fibers, which serves as above stated to break the oxide coatings on the foils, also improves the bonding of or blending of the crosswires with the matrix as the oxide coating on these wires is also broken during the compaction as the aluminum foils are caused to surround these wires and the fibers. It will be understood that this compaction and bonding takes place at a temperature just below the liquidus temperature of the aluminum so that the aluminum will be fully compacted around the fibers with no voids in the finished composite.

Thus, the composite is made up of tapes consisting of fibers held in collimated forms by interwoven crosswires of the material of the matrix and these tapes are arranged in a stack with interleaved foils. There is nothing placed in the stack except these tapes and the foils and nothing therefore to prevent direct contact between the foils and the fibers and deformation of the foils around the fibers to assure breaking of the oxide surfaces on the foils to permit direct contact between the unoxidized aluminum of the foils and the fibers as well as the adjacent foils where they are in contact between adjacent fibers of the tape.

It was found that adequate high strength in the composite would be obtained with a tape of this character, even with the densification and bonding occurring in air. The minimum of oxidation of the fibers that occurs in the handling and stacking is not detrimental since the loss of fiber strength due to oxidation is inhibited during the bonding and compaction to maintain the original fiber strength and produce a stronger composite.

These tapes and the resultant composite are significantly lower in cost than the plasma sprayed tapes described in said application. It was originally expected that this woven mat type of tape would prove unusable in air bonding because (1) the loss of fiber strength because of the oxidation of the fibers since there was no coating on the fibers that would be impervious to air and (2) the matrix would not bond because of the oxide on the fibers.

The results of tests showed these mat tapes to be comparable to the plasma sprayed tapes of the above patent when in the completed composite structure, as shown in the following comparison:

| TAPE | | | PANEL SIZE | FIBER STRENGTH ($10^3$ psi) | |
|---|---|---|---|---|---|
| Fiber | Binder | ATM | (in.) | Tape | Composite |
| 5.6B | Plasma | Air | 2 × 5 | — | 596 32 |

-continued

| TAPE | | | PANEL SIZE | FIBER STRENGTH ($10^3$ psi) | |
|---|---|---|---|---|---|
| Fiber | Binder | ATM | (in.) | Tape | Composite |
| *5.6B | none | Air | none | 520 | 350 |
| 8.0B | 5056 wire | Air | ½ × 3 | 480 64 | 493 56 |
| 8.0B | 5056 wire | Air | ½ × .3 | 480 64 | 492 79 |

*These data obtained by exposure of fiber to same bonding conditions, however, without any aluminum foils present.

The 5056 wire is an aluminum wire 0.002 inch in diameter and these wires were spaced apart about 0.25 inch in the tape or mat. The "tape" fiber strength is the strength of the tape fiber before being made into the composite, the "composite" fiber strength is that of a fiber extracted from the composite.

The data was obtained from composites made as above described and bonded in air. The fiber strengths indicated excellent material strength in the finished product as compared with the plasma sprayed composites. The composite structures made with the woven mat fibers were shown to be adequate for any of the presently known uses for this type of composite.

In making a composite, when the stack of tapes is completed, as shown in FIG. 2, the top tape of the stack is preferably covered by a layer of foil 14 to form a covering for the exposed fibers of the top tape or tapes in the stack. This top foil is bonded to the adjacent foil and to the enclosed fibers in the same manner as the interleaved foils between the tapes.

It will be understood that a stack may in certain instances consist of a single tape with foil on each side where the thickness of the completed compacted composite does not permit more than the single layer of tape. Whether the composite is made from a single tape stack or a multitape stack, the crosswires of the tape, if aluminum, are incorporated into and become an integral part of the matrix. In this way the composite, when densified and bonded, consists of the filaments and matrix; the wires, having served their purpose, disappeared into the matrix during the bonding and compaction. The result is a composite consisting only of fibers and the matrix of the foils, there being no material in the matrix such as the coatings used in the prior art to hold the fibers on the associated foil.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In the manufacture of a composite structure in air, the structure consisting of an aluminum matrix with a plurality of layers of high strength filaments therein, the steps of:

forming a mat consisting of a single layer of collimated spaced uncoated filaments held in mat form only by spaced aluminum crosswires interwoven with said filaments, assembling a plurality of these mats with interleaved aluminum sheets to form a stack, there being one foil sheet between adjacent mats, and densifying and bonding the stack of sheets and mats by heating in air to a temperature nearly the liquidus temperature of aluminum and compressing and compacting the stack to form a composite with the crosswires becoming a part of the aluminum matrix of the foils and with the foils on opposite sides of each tape of fibers brought into contact with one another between the fibers and bonded together to form the matrix.

2. The process of claim 1 in which the densification and bonding is done by heating and pressing the stack between heated platens.

* * * * *

UNITED STATES PATENT AND TRADEMARK OFFICE
CERTIFICATE OF CORRECTION

PATENT NO. : 4,260,441
DATED : April 7, 1981
INVENTOR(S) : KARL M. PREWO

It is certified that error appears in the above—identified patent and that said Letters Patent is hereby corrected as shown below:

Column 3, line 50: After the word "the", insert the words --case of--.

Signed and Sealed this

Fourteenth Day of July 1981

[SEAL]

Attest:

GERALD J. MOSSINGHOFF

Attesting Officer

Commissioner of Patents and Trademarks